Patented Nov. 24, 1953

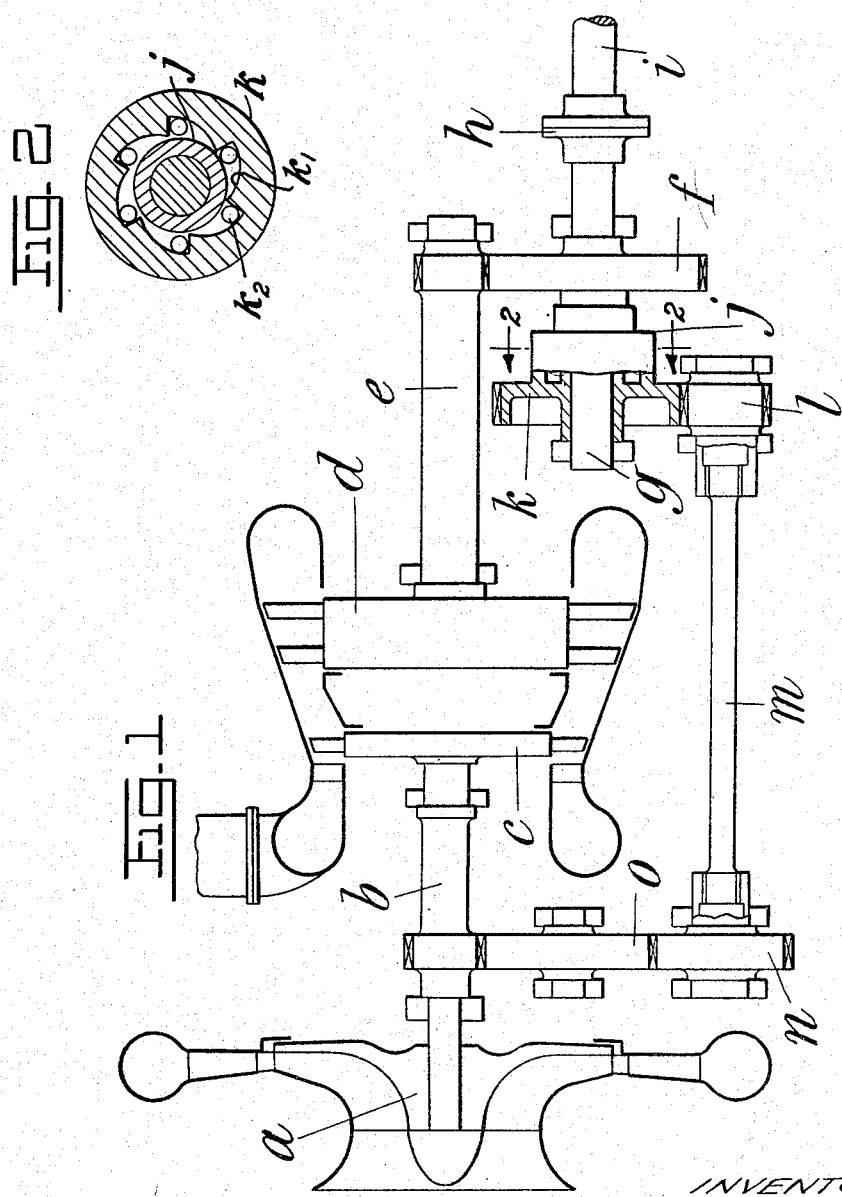

2,660,033

UNITED STATES PATENT OFFICE 2,660,033

FREEWHEELING CLUTCH BETWEEN A COMPRESSOR TURBINE AND AN OUTPUT TURBINE

Andrew Thomson Bowden, Jesmond, Newcastle-upon-Tyne, Alfred Müller, Penwortham, Preston, and Paul Kolb, Waldemar Hryniszak, and Otto Zadnick, Whitley Bay, England, assignors of one-sixth to C. A. Parsons & Company Limited, Newcastle-upon-Tyne, England Application March 8, 1949, Serial No. 80,242

1 Claim. (Cl. 60—39.16)

This invention relates to combustion turbines of all types embracing those in which the working fluid may be obtained from a solid, liquid, or gaseous source, for instance, gas, oil, or coal, and which may be produced either internally or externally.

This invention relates more particularly to turbine units in which one turbine group is mechanically coupled to one compressor group, and a separate output turbine is coupled to the load. It is an object of the invention to provide a turbine unit of this type in which means are provided for the control of the speed of the output turbine, and particularly means which limit this speed.

In arrangements of this type, the speed of the output turbine depends not only on the operating conditions for the compressor unit but also on the magnitude of the load, so that at a given operating condition for the compressor unit, the speed of the output turbine tends to increase as the load on the output shaft is reduced. If the load is removed altogether as, for instance, can happen in a unit used for vehicle propulsion during gear changing, it would be possible for the work turbine to accelerate to a higher speed, which may be as much as twice its normal operating speed. In normal cases this speed would be such that the turbine wheel would break under the excessive mechanical stresses.

There are various methods by which the speed of the output turbine can be controlled, such as by hydraulic means, or by permanently coupling a stage of the compressor to the output turbine, or even, in suitable cases, by increasing the number of stages of the output turbine.

However, in cases where the output turbine is normally operating very close to its maximum allowable speed, and in cases where it is possible to remove suddenly the load on the output turbine, it is essential that the speed of the output turbine should be controlled with certainty.

Another object of this invention is to provide improved methods for controlling the speed of the output turbine, free from the above disadvantages.

In general terms, this is done by coupling the output turbine mechanically to the compressor set in such a way that the coupling becomes effective whenever the speed of the output turbine reaches a certain ratio to that of the compressor set. This coupling is entirely automatic in operation and is independent of the actual speed of the output turbine.

A further advantage of this invention is that it enables the compressor turbine unit to be used as a braking unit and to absorb power through the output shaft from external sources. This is achieved by virtue of reducing the fuel supply to the turbine unit as a whole and using the compressor to absorb the external energy. Any proportion of external energy can be absorbed by altering the setting of the throttle valve, which controls the supply of fuel to the unit. It is necessary to provide, in addition, some control of the fuel supply in order to prevent the coupled output turbine and compressor set from overspeeding under the influence of excessive high external energy.

The accompanying diagrammatic drawing illustrates an arrangement of a suitable turbine unit according to one form of the present invention.

Figure 1 is a schematic elevational view of the turbine unit, a gear fixed to one member of the free wheeling clutch forming part of the assembly being shown in axial section; and Figure 2 is a section on the line 2—2 of Figure 1.

In carrying the invention into effect in the form illustrated a compressor $a$ is coupled through a shaft $b$ to a compressor turbine $c$, whose output is used solely for driving the compressor $a$. The working gas, after passing through the compressor turbine $c$, is led through, and gives up a further proportion of its energy to, an output turbine $d$, which is coupled through a shaft $e$ and gearing $f$ to an output shaft $g$, on which is fitted a clutch $h$ and a final output shaft $i$. This is the normal method of operation of the unit.

If the load on the shaft $i$ be reduced, or if the clutch $h$ be released, the output turbine $d$ tends to accelerate. When the speed of the output turbine $d$ becomes greater than a certain proportion of the speed of the compressor set $a$, $c$, a coupling $j$ and $k$ is effected. This coupling is of a type such that one half $j$ is fixed to the output shaft $g$ and the gear $f$, while the other half of the coupling is mounted concentrically with the first half $j$ but is free to move in such a way that it normally runs independently of the first part $j$ and, therefore, of the output shaft $g$. The part $k$ of the coupling is mechanically connected to the shaft $b$ of the compressor set $a$, $c$ through a gear $l$, quill shaft $m$ and further gears $n$ and $o$.

The coupling $j$, $k$ can be of any standard type such that the two halves $j$ and $k$ form a driving connection, when the speed of the part $j$ tends to become greater than the speed of the part $k$. In the drawing, there is shown a well known type of clutch, in which the driven member $k$ is formed with peripheral cam surfaces $k_1$, cooperating with balls or rollers $k_2$, so that when the speed of the driving member $j$ is less than that of the driven member $k$, the two members are uncoupled, but when the speed of the driving member $j$ tends to exceed that of the member $k$ the balls or rollers $k_2$ are wedged between member $j$ and cam surfaces $k_1$ to form a driving connection.

The operation of the unit is as follows:

For normal load conditions the coupling $j$, $k$ is not engaged and the various shaft speeds may, for example, be N revolutions per minute for the output turbine shaft $e$, ⅖ N revolutions per minute for the load shaft $g$, ⅚ N revolutions per minute for the compressor turbine shaft $b$ ⅘ N revolutions per minute for the quill shaft $m$, and ⅖ N revolutions per minute for the coupling element $k$, the gears being suitably chosen to give these figures. With such an arrangement, should the load requirements be such that the speed of the load shaft substantially falls, no effect is made on the coupling. If, however, the load requirements on the output shaft $g$ change so that the speed of this shaft tends to exceed ⅖ N revolutions per minute, this ratio being predetermined by the drive gear ratios as above set forth, the coupling $j$, $k$ will be engaged and the compressor will act as a brake, thereby limiting the speed of the load shaft $g$ and of the work turbine $e$ to ⅖ N and N respectively. Since the braking torque on the output shaft $g$ is an accelerating torque on the compressor set $a$, $c$ the braking energy is not dissipated but is absorbed in driving the compressor set, thus avoiding the power loss incident to external braking mechanisms and permitting energy absorption into the system from external sources coupled to the output shaft. When the load shaft speed falls below ⅖ N., the freewheel disengages and the work turbine $d$ once more runs separately from the compressor turbine unit.

We claim:

In a combustion turbine unit, and in combination, a compressor set comprising a compressor and a turbine driving the same, an output turbine normally running mechanically independently of the compressor set, and means for coupling the compressor set in driven relation to the output turbine, the last said means comprising gearing for driving the compressor set at a predetermined speed ratio to the output turbine, and a free wheeling clutch having a driving member driven by the output turbine, a driven member for driving the compressor set, and means for coupling the two said members together in driving engagement, when the speed of rotation of the driving member tends to exceed that of the driven member and for uncoupling the same when the speed of the driving member falls below that of the driven member, whereby the compressor set acts as a brake limiting the speed of the output turbine when it tends to exceed the said speed ratio to that of the compressor set.

ANDREW THOMSON BOWDEN.
ALFRED MÜLLER.
PAUL KOLB.
WALDEMAR HRYNISZAK.
OTTO ZADNICK.

References Cited in the file of this patent

UNITED STATES PATENTS

| Number | Name | Date |
|---|---|---|
| 2,371,889 | Hermitte | Mar. 20, 1945 |
| 2,399,046 | Larrecq | Apr. 23, 1946 |
| 2,402,725 | Birkigt | June 25, 1946 |
| 2,482,791 | Nettel | Sept. 27, 1949 |
| 2,547,660 | Prince | Apr. 3, 1951 |

FOREIGN PATENTS

| Number | Country | Date |
|---|---|---|
| 620,680 | France | Jan. 22, 1926 |
| 194,980 | Great Britain | Mar. 22, 1923 |